United States Patent [19]
Homann et al.

[11] Patent Number: 5,868,454
[45] Date of Patent: Feb. 9, 1999

[54] FOLDING TOP FOR A VEHICLE, PARTICULARLY A CONVERTIBLE

[75] Inventors: Bodo Homann, Heimsheim; Uwe Henn, Wimsheim; Reiner Armbruster, Alpirsbach; Joachim Kleinfelder, Leonberg, all of Germany

[73] Assignee: Dr. Ing. hcF Porsche AG, Germany

[21] Appl. No.: 713,427

[22] Filed: Sep. 29, 1996

[30] Foreign Application Priority Data

Sep. 13, 1995 [DE] Germany ............... 195 33 802.2

[51] Int. Cl.$^6$ ........................................... B60J 7/12
[52] U.S. Cl. ............................. 296/128; 296/131
[58] Field of Search ................... 296/128, 124, 296/132, 131, 121

[56] References Cited

U.S. PATENT DOCUMENTS

| 4,838,601 | 6/1989 | Kolb ................... 296/131 X |
| 5,197,778 | 3/1993 | Burst ................... 296/128 X |

FOREIGN PATENT DOCUMENTS

| 706 443 | 5/1941 | Germany. |
| 34 13379 C2 | 10/1985 | Germany. |
| 93 02 292.1 | 6/1994 | Germany. |
| 316810 | 9/1928 | United Kingdom. |

OTHER PUBLICATIONS

German Search Report dated Apr. 10, 1996.

*Primary Examiner*—Joseph D. Pape
*Attorney, Agent, or Firm*—Evenson, McKeown, Edwards & Lenahan, P.L.L.C.

[57] ABSTRACT

A folding convertible top for a vehicle is held in its closed position on the adjoining windshield frame by locking arrangement and, after the release of the locking arrangement can be displaced into a rear-side deposited position. The locking arrangement comprises a locking element with a locking hook arranged on a forward folding top section as well as at least one centering device which acts between the folding top and the windshield frame, and has projecting centering elements arranged on the forward folding top section. A detent device is provided for fixing the folded-back folding top, and the locking element with the locking hook arranged on the forward folding top section and the centering elements also provided on the forward folding top section also form operating parts of the rear-side detent device.

17 Claims, 5 Drawing Sheets

FOLDING TOP FOR A VEHICLE, PARTICULARLY A CONVERTIBLE

BACKGROUND AND SUMMARY OF THE INVENTION

This invention relates to a folding convertible top for a vehicle.

A known folding convertible top of the generic type, disclosed in German patent document DE 34 13 379 C2, is held in position on the adjoining windshield frame by means of a locking arrangement, after the release of which, it can be displaced into a rearward stowed position. The locking arrangement comprises a locking element arranged on the forward section of the folding top. It has a locking hook, and at least one centering device which acts between the folding top and the windshield frame and has projecting centering elements arranged on the forward section of the folding top. A detent device for maintaining the stowed folding top in the proper stowed position is not disclosed in this document.

German patent document DE-PS 706 443 discloses a detent device for the folded-back folding top, which includes a cog, arranged on the uppermost folding top bow and cut out in a fork shape, of a rotary lock which is spring biased on the bow disposed underneath. A striking plate is mounted on the vehicle body for receiving the head of the rotary lock. In this arrangement, the bows of the folding top, which are disposed above one another, are braced against one another and against the vehicle body so that, in a driving operation with the folding top open, vertical and lateral movements of the bows are prevented. This detent device, however, has multiple components, and requires a high-expenditure construction.

It is an object of the present invention to provide a detent device for a folding top folded back into the rearward deposited position, which operates well, has a simple construction and can be manufactured at reasonable cost.

This object is achieved by the locking arrangement according to the invention, in which the windshield-frame-side locking components arranged on the forward section of the folding top simultaneously form components of the rear-side detent device, and thus exercise a double function. As a result, the construction of the rear-side detent device is significantly simplified and the costs are reduced considerably. Such a detent device is particularly suitable for a folding top in which the forward section is displaced into the rear area by means of a control arm arrangement in such a manner that the top side of the forward section also forms the top side in the folded-back deposited position.

According to an embodiment of the invention, two laterally exterior, forward-projecting centering elements and the locking element (which is arranged in the center and has the locking hook) form operating parts of the rear-side detent device so that, on the body itself, only a spring-loaded central locking catch and two abutments for the centering elements must be provided. However, these components can be manufactured simply, at reasonable cost.

In the locking arrangement according to the invention, the locking hook has a molded-on projecting protrusion or nose which lockingly engages with the spring-loaded swivellable locking catch in the stowed position of the folding top, thereby preventing an upward movement of the folding top during driving operation. In the stowed position of the folding top, the laterally exterior, body-mounted abutments interact with the centering elements directed diagonally to the front, and fix the top in the transverse and downward directions. The spring element is biased to rotate in the counterclockwise direction, so as to swivel the locking catch toward the front in the driving direction. A stop provided on the supporting frame bounds the swivel movement toward the front.

Other objects, advantages and novel features of the present invention will become apparent from the following detailed description of the invention when considered in conjunction with the accompanying drawings.

DETAILED DESCRIPTION OF THE DRAWINGS

Figure 1:
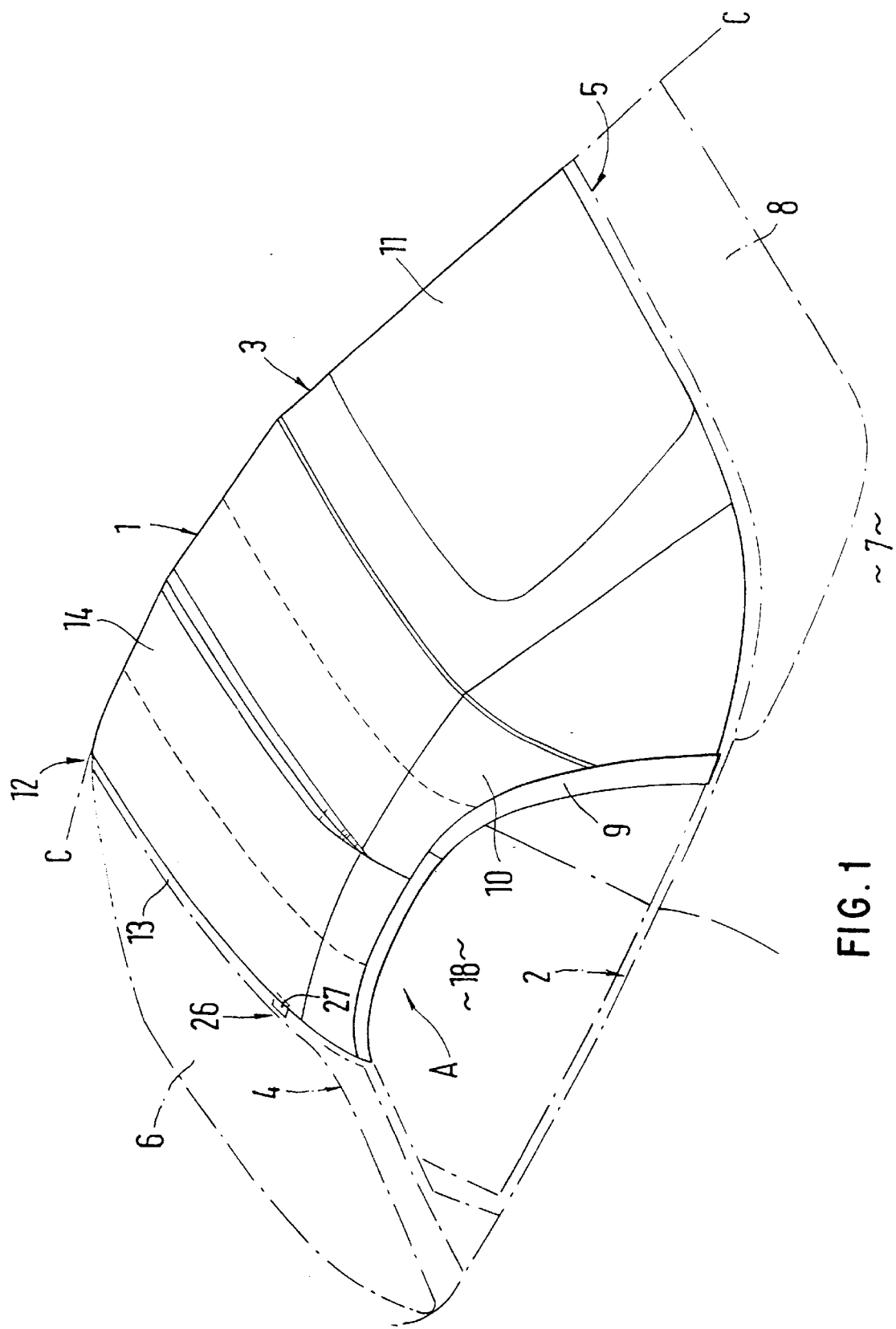
FIG. 1 is a perspective view of a vehicle with a folding top in the closed position A.

FIG. 1 shows a partial area of a passenger car 1 which has a folding top 3 above a belt line 2. The folding top 3 extends into a closed position A between a windshield frame 4 which accommodates a windshield 6 and a rear area 5. In the rear area 5, a folding top compartment 7 is provided which, at least in areas, is covered in the upward direction by a folding top compartment lid 8. The folding top 3, which can be displaced from the closed position A into a rearward stowed position B (FIGS. 2–4) and vice-versa, is composed of a folding top structure 9 and a folding top covering 10 held in position on the folding top structure 9. In the rear area of the folding top covering 10, a flexible or rigid viewing pane 11 is provided.

The folding top 3 is held in its closed position A by a releasable locking device 12 (FIG. 1) on the upper transversely extending area 13 of the windshield frame 4.

Figure 3:
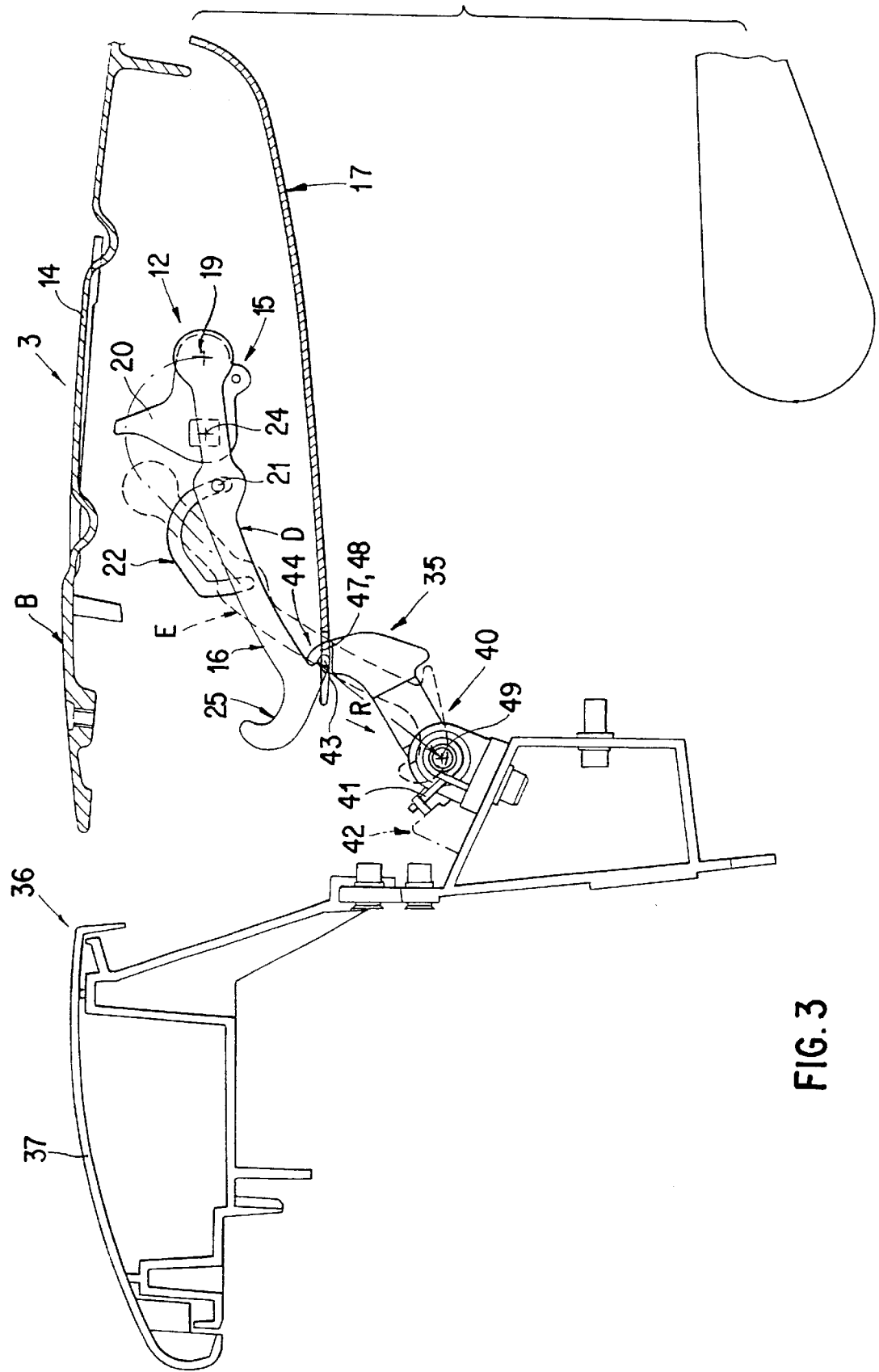
FIG. 3 is an enlarged sectional view along Line III—III of FIG. 2, which shows the detent device according to the invention.

The locking arrangement 12 comprises at least one locking element 15 arranged in the area of a longitudinal center plane C—C of the vehicle on a forward, dimensionally stable folding top section 14 of the folding top 3. In the closed position A, a motor-driven locking hook 16 of the locking element 15 is operatively connected with a receiving device (not shown) on the windshield frame 4. The locking arrangement 15 is depicted in FIG. 3 in the context of the stowed position B, although the locked and unlocked positions of the locking hook 16—as explained hereinafter—are the same in both the closed position A and the stowed position B. The engagement of the locking hook 16 with the receiving elements on the windshield in the closed position A, is conventional, and accordingly is not shown.

The locking element 15 is controlled by means of an operating switch (not shown) from the passenger compartment 18. According to FIG. 3, the locking element 15 is covered in the direction of the passenger compartment 18 at least in sections, by a panel 17.

The locking hook 16 of the locking element 15 interacts at its rearward end 19 with a rotatable cam 20, which can be swivelled about a point of rotation 24. Furthermore, a projecting pin 21 locally mounted on the locking hook 16 is guided in a stationary connecting link path 22. In the locked position of the locking hook 16, the pin 21 is situated adjacent to a rearward end of the connecting link path 22 (FIG. 3).

On its end opposite the cam 20, the locking hook 16 has a hook section 25 which, in the closed position A of the folding top 3, interlocks with a receiving device (not shown) of the windshield frame 4, and fixes the folding top 3 in the longitudinal direction.

In addition, the locking arrangement 12 comprises two laterally exterior centering devices 26 (depicted schematically in FIG. 1). Each centering device 26 has a projecting centering element 27 (FIG. 3) which is arranged on the forward dimensionally stable folding top section 14 and which, in the closed position A of the folding top 3, is operatively engaged with the receiving device of the windshield frame 4.

Figure 4:
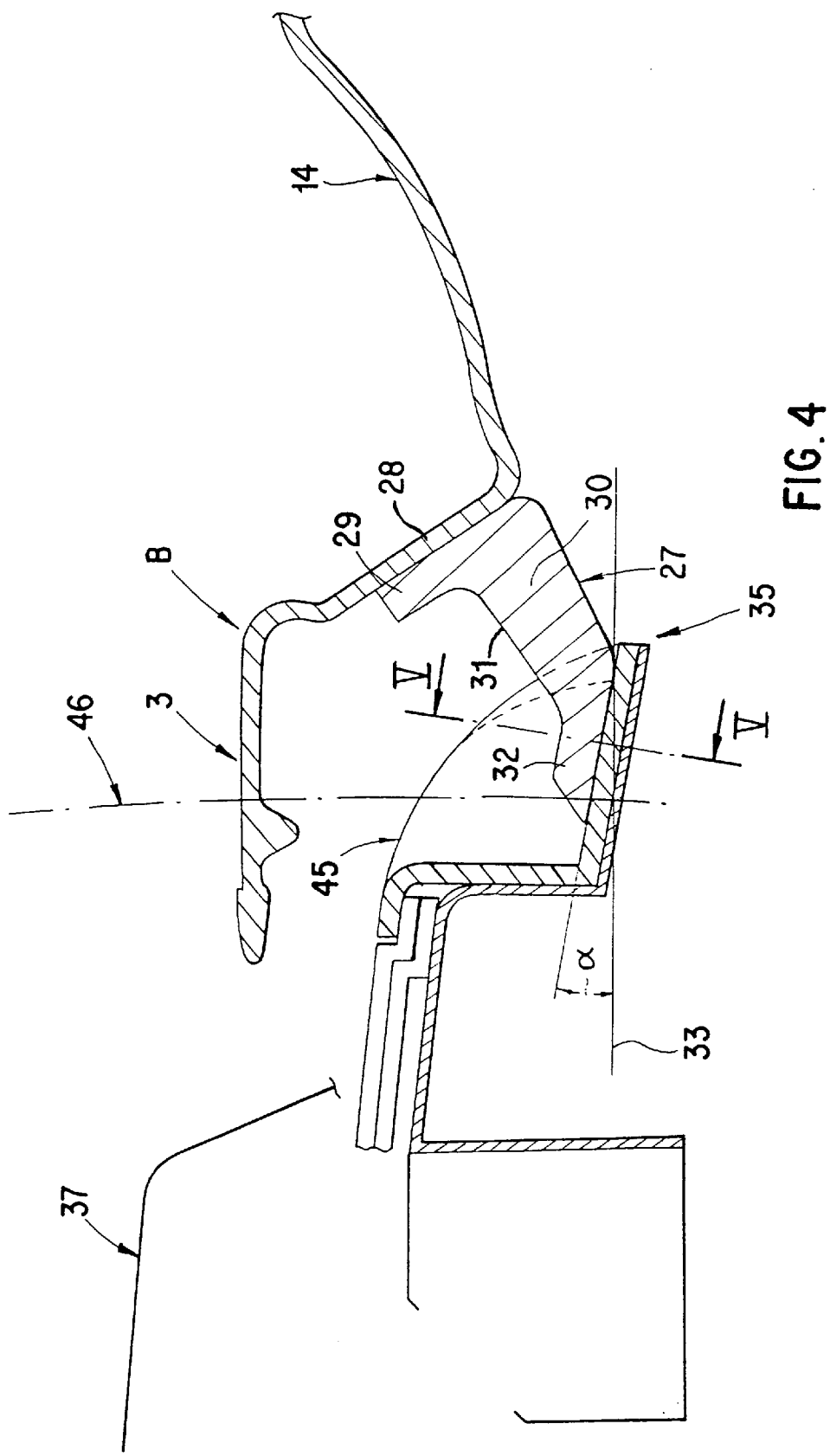
FIG. 4 is an enlarged sectional view along to Line IV—IV of FIG. 2, which shows the detent device according to the invention.

By means of the two centering devices 26, the folding top 3, in the closed position A, is fixed in both the transverse and vertical directions of the vehicle. Releasable fastening screws (not shown), connect the centering element 27 to a wall section 28 of the large-surface, dimensionally stable folding top section 14 which extends diagonally from the forward top toward the rearward bottom and, in the cross-sectional view, has a profiled shape (FIG. 4). A fastening flange 29 of the centering element 27 rests on the exterior side of the wall section 28. From the fastening flange 29, a first leg 30 extends toward the front, whose upper boundary edge 31 is aligned approximately at a right angle to the fastening flange 29. In the cross-sectional view, the first leg 30 tapers toward the front. The leg 30 adjoins a second leg 32 which extends at an angle thereto and which, with respect to a horizontal auxiliary plane 33, rises toward the front at an angle α.

The folding top structure 9 is constructed such that, during the displacement of the folding top 3 from the closed position A toward the rear into the stowed position B, the forward dimensionally stable folding top section 14, maintains its exterior side; that is, the forward folding top section is displaced rearwardly, but is not rotated by 180°.

Figure 2:
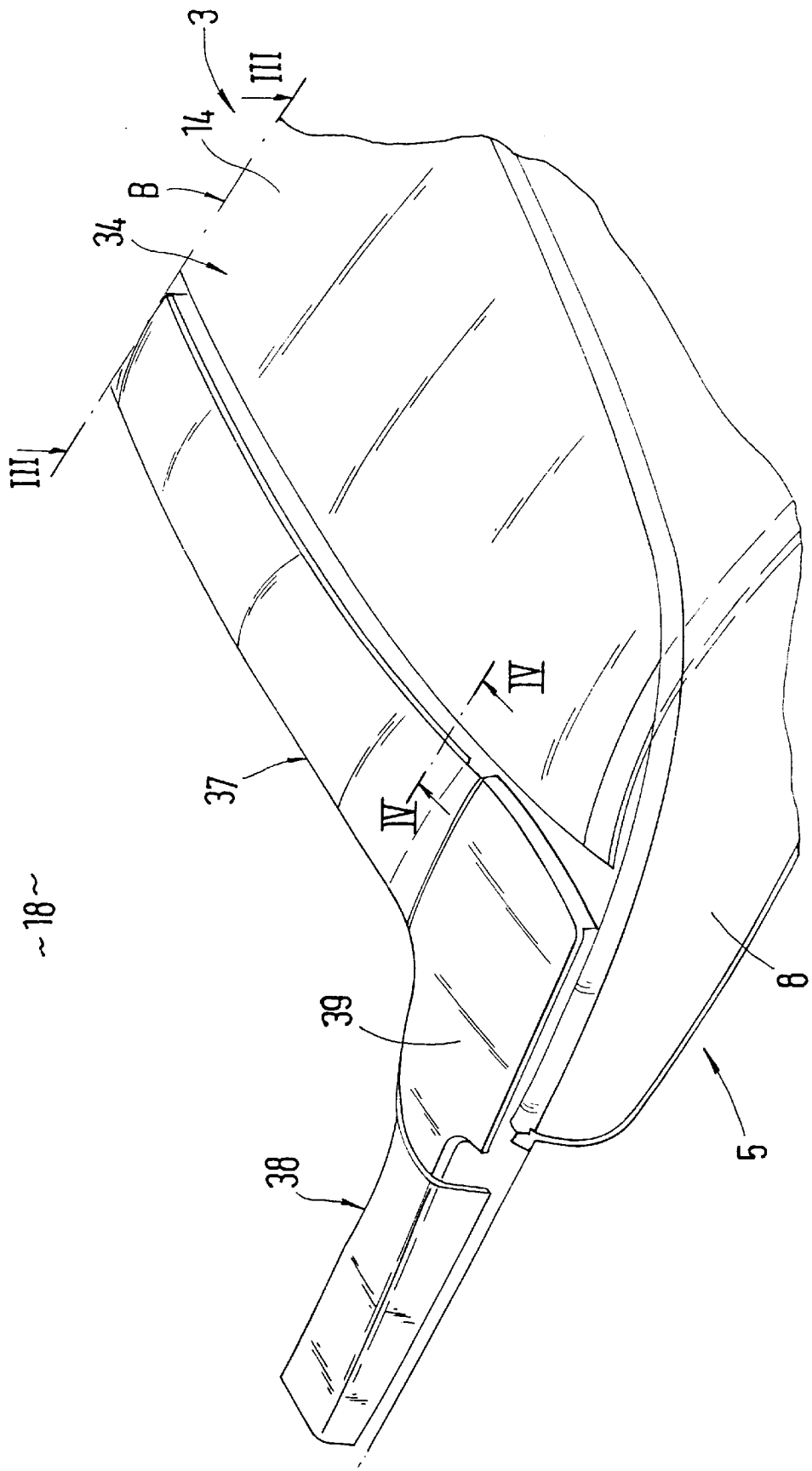
FIG. 2 is a perspective view of the folding top in the stowed position B.

In the stowed position B of the folding top 3 (FIGS. 2–4), the folding top section 14 forms a covering 34 of the folding top compartment 7, which is situated forward of the folding top compartment lid 8. In order to prevent lifting and lowering movements as well as lateral movements of the folded-back folding top 3 due to the dynamic load in the driving operation, a detent device 35 is provided. According to the invention, the locking element 15 (including the locking hook 16) and the projecting centering elements 27, which are mounted on the folding top section 14, also form components of the rear side detent device 35. The counterparts of the detent device 35 to the locking hook 16 and the centering elements 27 are arranged on a transversely extending body-side supporting frame 36 disposed in front of the folded-back folding top 3 (FIG. 3). In the upward direction, the supporting frame 36 is covered by a transversely extending panel 37. FIG. 2, in addition, shows the rear side panel 38 and a swivellable flap 39.

In the stowed position B of the folding top 3, the locking hook 16 of the locking element 15 is operatively engaged with a swivellable locking catch 40, which is mounted on the supporting frame 36, and is biased to rotate in a counterclockwise direction (FIG. 3) by a spring element 41. A stop 42 bounds the swivel movement of the locking catch 40 toward the front.

In the embodiment, the locking hook 16 and the locking catch 40 are arranged approximately in the area of the longitudinal center plane C—C of the vehicle.

In the stowed position B of the folding top 3, a projecting nose 43 formed on a lower end area of the locking hook 16, interlocks with a correspondingly constructed upper end area 44 of the locking catch 40. Specifically, the nose 43 is situated on the same end of the hook 16 as the hook section 25, on the opposite side thereof. The end area 44 of the locking catch 40 reaches around the nose 43 of the locking hook 16 and interacts with it in a hooking manner.

In addition, respective trough-shaped abutments 45 (FIG. 4) are arranged in a laterally exterior area on the supporting frame 36, and are operatively connected with the projecting centering elements 27 in the stowed position B of the folding top 3. When the folding top 3 is lowered, the centering elements 27 engage in the abutments 45, which are open in the upward direction (FIG. 5) and fix the folding top 3 in the transverse and downward directions. During the lowering, the folding top 3 and the centering elements 27 move along an upright curved path 46 (FIG. 4).

The interaction of the locking catch 40 and the locking hook 16, prevents upward movements of the stowed folding top 3.

Starting with the folding top in its closed position A, its operation takes place as follows: Pressing of the operating switch arranged in the passenger compartment 18 causes the motor-driven locking hook 16 to move from its locking position D (FIG. 3) into an unlocking position E (shown by the broken lines in FIG. 3) and the folding top 3 is displaced toward the rear into the stowed position B. The weight of the folded-back folding top 3 presses the upper forward folding top section 14 on the body-side abutments 45 of the supporting frame 36, constraining the folding top 3 in the transverse and downward directions. A microswitch arranged on a hydraulic cylinder of the folding top drive (not shown) indicates when the folding top 3 has reached the open position. The control unit then advances by one position and the locking hook 16 is moved rearward toward the inside, back into its locking position D. As a result of such movement, the molded-on nose 43 of the locking hook 16 hooks into the correspondingly constructed end area 44 of the locking catch 40.

The mutually interacting contact surfaces 47, 48 of the locking catch 40 and the nose 43 have a radius-shaped construction, the center point of the radius coinciding with the point of rotation 49 of the locking catch 40. This ensures a simple emergency unlocking of the detent device 35.

The centric connection between the locking hook 16 and the locking catch 40 has the effect that the stowed folding top 3 cannot move upwards in the driving operation.

Figure 6:
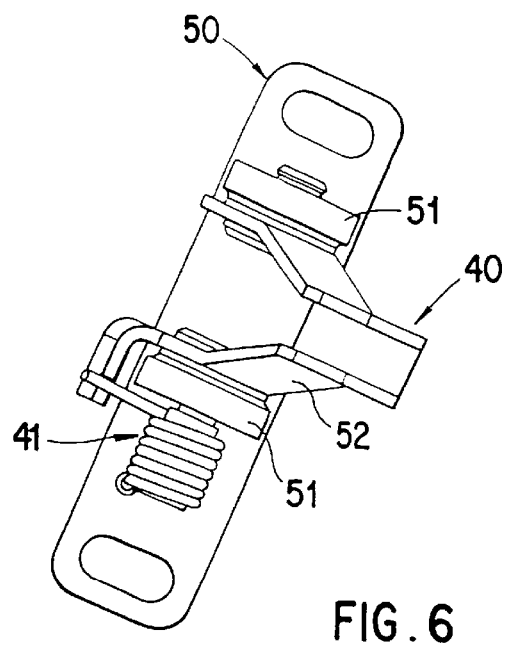
FIG. 6 is a view in the direction of the arrow R of the locking catch fixed on the supporting frame.

As shown in FIG. 6, the locking catch 40 comprises a stationary base plate 50 fastened on the supporting frame 36, with two upright bearing sections 51 on which the swivellable, spring-loaded top part 52 of the locking catch 40 is rotatably disposed.

Figure 5:
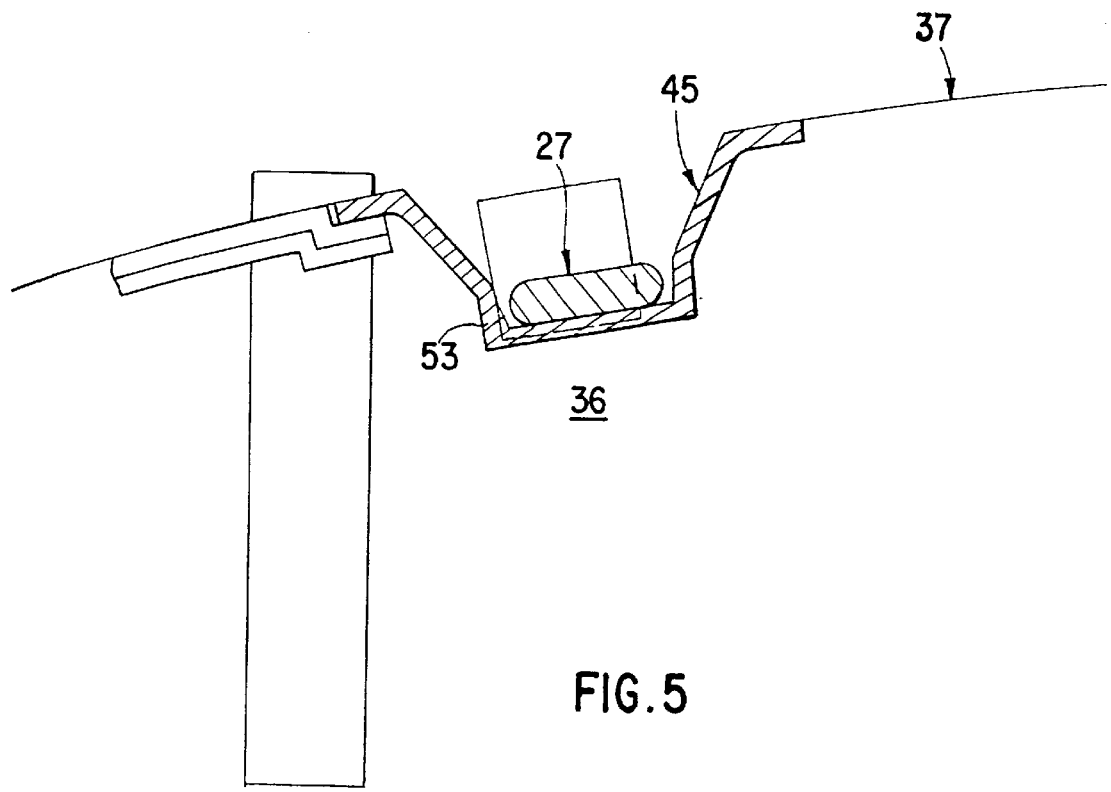
FIG. 5 is a sectional view along Line V—V of FIG. 4.

FIG. 5 shows the trough-shaped abutment 45 arranged on the top side of the supporting frame 36, which abutment 45 expands in a funnel shape from a receiving section 53 adapted to the centering element 27 in the upward direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking arrangement for releasably securing a folding vehicle top, in a closed position on an adjoining windshield frame of a vehicle, which vehicle top, after release of the locking arrangement, can be displaced into a rearwardly disposed stowed position, said locking arrangement comprising:

a locking element with a locking hook arranged on a forward folding top section of said vehicle top;

at least one centering device which acts between the folding top and the windshield frame and has projecting centering elements arranged on the forward folding top section; and detent parts for retaining the top, in its folded-back, rearward stowed position;

wherein the detent parts are formed by operating parts of at least one of the locking element, and the centering elements.

2. Locking arrangement according to claim 1, wherein said detent arrangement further comprises a spring-loaded, swivellable locking catch mounted on a transversely extending body-side supporting frame disposed forward of the stowed folding top and adapted to be operatively engaged with the locking hook of the locking element in the stowed position of the folding top.

3. Locking arrangement according to claim 1 wherein the detent device consists of a locking hook and a locking catch which extend in the area of the longitudinal center plane of the vehicle.

4. Locking arrangement according to claim 2 wherein said locking hook has a projection which interacts in a form-locking manner with a correspondingly constructed upper end area of the locking catch in the stowed position of the folding top.

5. Locking arrangement according to claim 4, the projection is provided on a lower end area of the locking hook, on a side thereof which is opposite a hook portion of the locking hook.

6. Locking arrangement according to claim 1 further comprising projecting centering elements which are arranged at laterally exterior areas on a forward dimensionally stable folding top section, and interact with correspondingly constructed body-mounted abutments in the stowed position of the folding top.

7. Locking arrangement according to claim 6 wherein said abutments are trough-shaped, and are arranged on a transversely extending, supporting frame of a body of said vehicle.

8. Locking arrangement according to claim 1, wherein the locking hook is motor-driven.

9. Locking arrangement according to claim 2, wherein the locking hook is motor-driven.

10. Locking arrangement according to claim 6, wherein the locking hook is motor-driven.

11. Locking arrangement for releasably securing a folding vehicle top in a closed position wherein the vehicle top encloses a vehicle passenger compartment and is lockingly engaged at a forward edge thereof with a vehicle windshield frame, said vehicle top being movable following release of said locking arrangement into a rearwardly disposed stowed position wherein said vehicle top is folded and stowed in a compartment therefor, and is fixed in said stowed position, said locking arrangement comprising:

a locking hook element which is displaceable between an engaged position and a disengaged position;

said locking hook element having a hook portion adapted for locking engagement with correspondingly shaped receiving elements of a vehicle windshield frame, when said locking hook element is in said engaged position; and said locking hook element also having a protrusion formed thereon for releasably engaging with operating elements of a detent arrangement, for fixing said vehicle top in said stowed position, when said locking hook element is in said engaged position.

12. Locking arrangement according to claim 11 wherein said hook portion of said locking hook element is arranged at a first end thereof and projects in a forward direction of said vehicle, and said protrusion is arranged at said first end and projects in a rearward direction of said vehicle.

13. Locking arrangement for releasably securing a folding vehicle top in a closed position wherein the vehicle top encloses a vehicle passenger compartment and is lockingly engaged at a forward edge thereof with a vehicle windshield frame, said vehicle top being movable following release of said locking arrangement, into a rearwardly disposed stowed position wherein said vehicle top is folded and stowed in a compartment therefor, said locking arrangement comprising:

a locking hook element which is displaceable between an engaged position and a disengaged position, and has a hook portion adapted for locking engagement with correspondingly shaped receiving elements of a vehicle windshield frame when said locking hook element is in said engaged position; and a detent arrangement for releasably constraining movement of said vehicle top when said vehicle to is in said stowed position;

wherein said locking hook element also has a protrusion formed thereon for releasably engaging with operating elements of said detent arrangement, for fixing said vehicle top in said stowed position, when said locking hook element is in said engaged position.

14. Locking arrangement according to claim 13 wherein said hook portion of said locking hook element is arranged at a first end thereof and projects in a forward direction of said vehicle and said protrusion is arranged at said first end and projects in a rearward direction of said vehicle.

15. Locking arrangement according to claim 14 wherein said detent arrangement comprises a rotatable locking catch which is spring biased to rotate in said forward direction and has a recess adapted to operatively engage with the protrusion of said locking hook element.

16. Locking arrangement according to claim 15 wherein said locking catch has a spring element which holds said recess in operative locking engagement with said protrusion of said locking hook element when said vehicle top is in said stowed position and said locking hook element is in said engaged position.

17. Locking arrangement according to claim 15 wherein movement of said locking hook element into said disengaged position causes said protrusion to disengage from said recess.

* * * * *